Dec. 7, 1954   R. L. TOFFOLON   2,696,360
BINDER AND HITCH FOR CARGO PALLETS
Filed Aug. 17, 1951
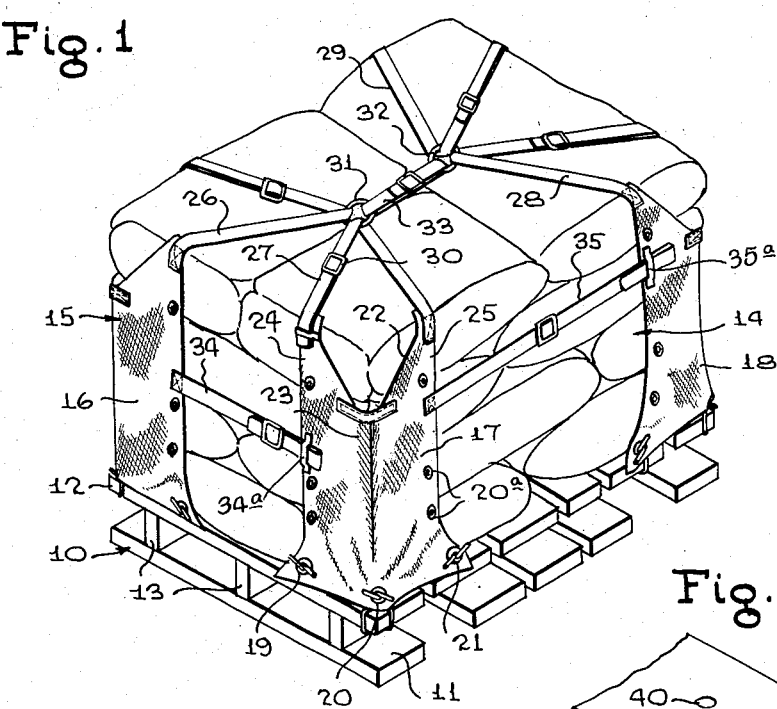
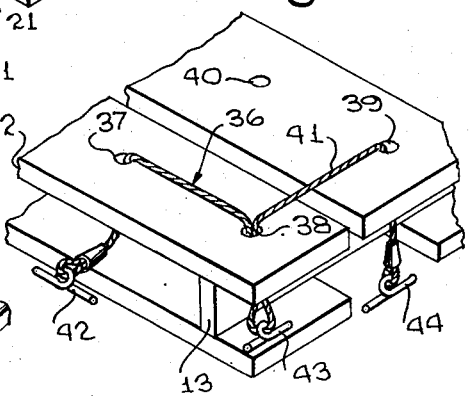
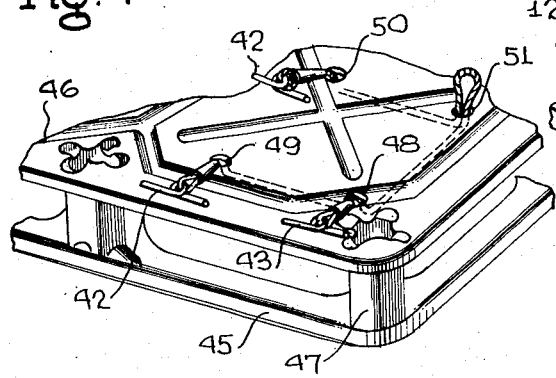
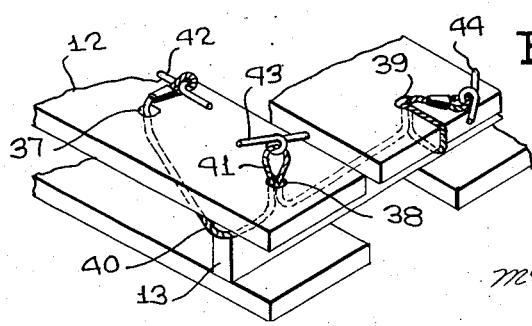
INVENTOR
ROGER L. TOFFOLON
BY McMorrow, Berman & Davidson
ATTORNEYS

United States Patent Office 2,696,360
Patented Dec. 7, 1954

2,696,360

BINDER AND HITCH FOR CARGO PALLETS

Roger Louis Toffolon, Plainville, Conn.

Application August 17, 1951, Serial No. 242,384

3 Claims. (Cl. 248—361)

This invention relates to cargo handling apparatus and more particularly to a binder and binder hitch for securing a load of bagged material, cartons, packages, crates, et cetera, on a cargo pallet.

It is among the objects of the invention to provide an improved binder and sling assembly for securing loads on cargo pallets or portable platforms, wherein the binder includes wide stripes of heavy sheet material, such as fabric or sheet plastic, which extend over the four corners of the load and protect the exposed portions of the load during handling and transportation thereof; wherein the ends of the corner portions of the binder are detachably connected to the corner portions of the pallet by a simplified hitch which facilitates the attachment of the binder to and detachment of the binder from the pallet and provides for adjusting the binder to loads of different sizes and heights; wherein the binder is provided with an adjustable structure interconnecting the corner strips; wherein the binder includes adjustable lateral members connected to the corner strips intermediate the length of the latter for holding the load in shape; which binder and hitch assembly is attachable to various types of cargo pallets and requires no special pallet construction; and which is simple and durable in construction, economical to manufacture, efficient and effective in operation, and may be used a large number of times.

Other objects and advantages will become apparent from a consideration of the following description and the appended claims in conjunction with the accompanying drawing wherein:

Figure 1 is a perspective view of a cargo pallet and pallet supported load with a binder illustrative of the invention enclosing the load and secured to the pallet by hitches also illustrative of the present invention;

Figure 2 is a perspective view on a somewhat enlarged scale of a fragmentary portion of a cargo pallet illustrating one manner of connecting the hitch to a corner of the pallet;

Figure 3 is a fragmentary perspective view similar to Figure 2 illustrating a different manner of applying the hitch to the pallet; and Figure 4 is a perspective view similar to Figures 2 and 3, but showing the hitch applied to a different form of pallet from that shown in Figures 2 and 3.

With continued reference to the drawing, the pallet shown in Figures 1, 2 and 3, and generally indicated at 10, may be of standard construction and comprises a lower platform or base 11 of rectangular shape composed of planks disposed in spaced apart and substantially parallel relationship to each other, and an upper load carrying platform 12 also formed of planks and disposed in spaced apart and substantially parallel relationship to each other and supported on the lower platform or base by webs or girders 13 disposed in spaced apart and substantially parallel relationship to each other between the platforms 11 and 12. The upper platform 12 is also of rectangular shape and has substantially the same size as the lower platform 11 and is supported above the lower platform a distance sufficient to permit the forks of a fork lift truck to be inserted between the upper and lower platforms for lifting the pallet with a load supported thereon.

The numeral 14 generally indicates a load of any commodity, such as bags of stock feed, fertilizer or cement, or packaged or crated goods, et cetera, supported on the load carrying platform 12 and arranged in a substantially rectangular or cubicle shape on the pallet.

The numeral 15 generally indicates a binder for securing the load on the pallet during the handling and transportation of the load. This binder includes four legs or corner pieces, three of which are illustrated in Figure 1, and designated at 16, 17 and 18, each of these corner pieces being substantially of elongated rectangular shape and formed of a sheet of strong, flexible material, such as heavy canvas. Each corner piece has three grommets, as indicated at 19, 20 and 21 for the corner piece 17, located near one end thereof and disposed one near each of the two corners at the corresponding end of the corner piece and one substantially at the mid-width location of the corner piece, additional grommets, as indicated at 20a, spaced apart along each edge of the corner piece. At their other ends the corner pieces are provided with notches, as indicated at 22 for the corner piece 17, and the corner pieces are reinforced at the inner or apex ends of these notches by reinforcing strips, as indicated at 23.

The notch extends inwardly from the other end of each corner piece intermediate the side edges thereof and permits the corner pieces to fold neatly at the upper corners of loads of different heights and provides at the corresponding end of the corner piece two spaced apart tabs, as indicated at 24 and 25, located one at each side of the corner piece. Adjustable length straps, as indicated at 26, 27, 28 and 29, are connected one to each corner piece at the ends of the corner pieces having the notches therein. Each of these straps, as is clearly illustrated in the case of the strap 27 for the corner piece 17, is connected at one end to one of the corner piece tabs and at its other end to the other corner piece tab and is provided intermediate its length with a buckle 30, by means of which the length of the strap can be adjusted. Intermediate their lengths the two straps, such as the straps 26 and 27, connected to the corner pieces at one end of the binder, pass through a common ring 31, and the straps 28 and 29 for the corner pieces at the other end of the binder pass intermediate their lengths through a common ring 32. The two rings are connected together by an adjustable length linking strap 33 which has end loops in which the rings are received, and a buckle or other means for holding the strap at various length adjustments. Most variations in load height can be compensated by adjusting the length of strap 33 without changing the length of straps 26, 27, 28 and 29, the latter being adjusted only when variations in load height exceeds predetermined limits.

Adjustable length straps, as indicated at 34 and 35, are connected between adjacent corner pieces intermediate the length of the corner pieces, the strap 34 being illustrated in Figure 1 as arranged transversely of and projecting from a side edge of the leg or corner piece 16 intermediate the one end and the notch 22 and having one end fixedly attached to the leg 16 with the strap 34 secured to a securing element or loop 34a positioned along the other side edge of the leg 17, and the strap 35 being likewise arranged transversely of and projecting from a side edge of the leg or corner piece 17 intermediate the one end and the notch 22 and having one end fixedly attached to the leg 17 with the strap 35 secured to a securing element or loop 35a positioned along the other side edge of the leg 18. Other additional straps, will, of course, be connected between the remaining adjacent corner pieces and these straps materially assist in holding the load in its generally rectangular shape on the rectangular cargo pallet and assist in placing the entire binder assembly under tension.

Additional ties may also be secured between adjacent edges of the corner strips using some or all of the grommets 20a for this purpose, to further tighten the binder and secure the load therein.

Each corner piece of the binder is secured to the pallet at corresponding corners of the latter by a hitch, as generally indicated at 36.

The upper load carrying platform and pallet is provided at each corner with spaced apart apertures, as designated at 37, 38 and 39 in Figure 3, and 37, 38, 39 and 40 in Figure 2, and the hitch 36 comprises an elongated flexible strand 41, preferably a wire cable of small size, and three crossbars 42, 43 and 44 connected to the strand, one at each end thereof, and one intermediate the length of the strand.

Each crossbar is provided with an eye substantially at its mid-length location and the eyes of the end crossbars are engaged by loops formed at the ends of the strand while the eye of the intermediate crossbar slidably receives the strand between the end loops.

In the arrangement illustrated in Figure 2, the ends of the hitch are inserted downwardly through the end apertures 37 and 39 of the group of apertures at corresponding corners of the pallet, and the intermediate portion of the hitch is looped and also extended downwardly through the center aperture 38. The loop and the ends of the hitch are then brought up over the outer edge of the upper platform 12 of the pallet and the crossbars 42, 43 and 44 are passed through the grommets 19, 20 and 21 of the corner piece 17, as illustrated in Figure 2, and disposed crosswise of these grommets at the outer sides thereof, the crossbars being longer than the diameter of the grommets, so that they engage the grommets and secure the corner piece to the pallet. This arrangement secures a load of maximum size to the pallet.

In the arrangement illustrated in Figure 4, the ends and the center loop of the hitch are passed upwardly through the corresponding apertures in the load carrying platform, so that the crossbars are disposed inwardly of the edge of the platform and the crossbars are then inserted in the grommets, in the manner indicated above, one end portion of the strand 40 being wrapped around the portion of the platform between the edge of the platform and the corresponding aperture to shorten the effective length of the binder. This arrangement is used for loads of less than those for which the arrangement illustrated in Figures 2 and 3 is provided, the construction being such that the binder can be tightly wrapped about loads of various sizes, any slack in the binder not taken up by the hitch being taken up by adjusting the straps 33 at the top of the load. For loads of small height, the end crossbars of the hitch may be inserted through selected grommets 20a along the edges of the corner pieces to shorten the effective length of the corner pieces, the corner pieces, in this case, being folded or doubled below the selected grommets.

A metal pallet is illustrated in Figure 4, this pallet having a rectangular bottom plate 45 and a rectangular upper or load carrying plate 46 supported on the bottom plate by means including the hollow posts 47, one of such posts being located at each corner of the pallet. The upper plate 46 is provided at each corner with a group of spaced apart holes, as indicated at 48, 49, 50 and 51.

The hitch is shown applied to the pallet in Figure 4 in a manner such that one end of the hitch is engaged in the hole 50 remote from the corresponding corner of the top plate, and loops of the hitch extend outwardly through the holes 51 and 48, one of these loops carrying the intermediate crossbar 43 and the other being threaded directly through one of the corner piece grommets, and the other end of the hitch extends upwardly through the hole 49.

In this case, the fourth hole 50, spaced from the remaining holes, is utilized to take up slack in the hitch, so that proper tension can be applied to the binder.

The binder hitch arrangement, whether utilizing three or four holes in the pallet, has the advantage of reducing the slack of the hitch and binder to a minimum. When crossbar 42 at one end of the hitch, for example, is inserted through a grommet, the slack in the adjacent portion of the hitch is taken up by tension applied at the intermediate crossbar 42, and after this crossbar has been inserted through a grommet, the slack is again taken up by tension at the other end crossbar 44. By thus substantially eliminating slack in the hitches, it is possible to maintain the binder assembly substantially parallel to the load supporting surface of the associated pallet.

This arrangement may be used for loading and unloading goods with fork lift trucks, may be also used in warehouses and with transportation vehicles, such as trucks, railway cars, airplanes and ships, to maintain the cargo in proper condition against shifting during transportation and to facilitate unloading of the cargo at destination.

The binder and hitch assemblies may be left attached to the pallets when the loads are removed from the pallets, if desired, and may be returned to the shipper along with the pallets. In any case, the binder hitch assemblies can be used repeatedly a large number of times, and in many cases, will last substantially as long as the pallets.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A binder for securing a cargo on a pallet of rectangular shape comprising a plurality of legs, each leg being fabricated of a single sheet of flexible material and having one end adapted to extend about and overlie a corner of said pallet, said one end of each of said legs being provided with means for attachment to a corner of said pallet, each of said legs having a notch extending inwardly from the other end intermediate the side edges thereof, the portions between the side edges of each leg and the adjacent notch providing a pair of spaced apart tabs, and a strap extending from and connected to the free ends of each pair of tabs the strap of each leg being interconnected together with the straps of the other legs at the intermediate portions by a linking strap.

2. A binder for securing a cargo on a pallet of rectangular shape comprising a plurality of legs, each leg being fabricated of a single sheet of flexible material and having one end adapted to extend about and overlie a corner of said pallet, said one end of each of said legs being provided with means for attachment to a corner of said pallet, each of said legs having a notch extending inwardly from the other end intermediate the side edges thereof, the portions between the side edges of each leg and the adjacent notch providing a pair of spaced apart tabs, a reinforcing strip extending about the apex end of the notch of each leg and secured to the latter, and a strap extending from and connected to the free ends of each pair of tabs the strap of each leg being interconnected together with the straps of the other legs at the intermediate portions by means of a linking strap.

3. A binder for securing a cargo on a pallet of rectangular shape comprising a plurality of legs, each leg being fabricated of a single sheet of flexible material and having one end adapted to extend about and overlie a corner of said pallet, said one end of each of said legs being provided with means for attachment to a corner of said pallet, each of said legs having a notch extending inwardly from the other end intermediate the side edges thereof, the portions between the side edges of each leg and the adjacent notch providing a pair of spaced apart tabs, a strap extending from and connected to the free ends of each pair of tabs, at least one strap arranged transversely of and projecting from a side edge of each leg intermediate said one end and the adjacent notch and having one end fixedly attached to said leg, and an attaching element along the other side edge of each leg for attachment thereto of the other end of the adjacent leg strap the straps connected to the free ends of each pair of tabs being interconnected together at the intermediate portions by means of a linking strap.

References Cited in the file of this patent

UNITED STATES PATENTS

| Number | Name | Date |
| --- | --- | --- |
| 1,156,540 | Marquis | Oct. 12, 1915 |
| 1,321,742 | Hendricks | Nov. 11, 1919 |
| 2,197,598 | Way | Apr. 16, 1940 |
| 2,437,058 | Waters | Mar. 2, 1948 |
| 2,465,134 | Toffolon | Mar. 22, 1949 |